US006945223B2

(12) United States Patent
Hoshi

(10) Patent No.: US 6,945,223 B2
(45) Date of Patent: Sep. 20, 2005

(54) FAILURE DIAGNOSTIC APPARATUS FOR INTAKE AIR STREAM CONTROL DEVICE AND CONTROL METHOD OF FAILURE DIAGNOSTIC APPARATUS

(75) Inventor: Koichi Hoshi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/023,432

(22) Filed: Dec. 29, 2004

(65) Prior Publication Data

US 2005/0155418 A1 Jul. 21, 2005

(30) Foreign Application Priority Data

Jan. 16, 2004 (JP) ............................ 2004-009242

(51) Int. Cl.[7] ............................................. F02D 41/00
(52) U.S. Cl. .......................... 123/339.15; 123/406.12; 123/406.13
(58) Field of Search ....................... 123/339.11, 339.1, 123/339.15, 344, 406.12, 406.13, 480, 198 D

(56) References Cited

U.S. PATENT DOCUMENTS 6,601,384 B2 * 8/2003 Isobe et al. .................. 60/285
6,647,959 B2 * 11/2003 Noguchi .................... 123/396

FOREIGN PATENT DOCUMENTS

| | | |
|---|---|---|
| JP | A 7-83101 | 3/1995 |
| JP | A 9-42041 | 2/1997 |
| JP | A 2001-20782 | 1/2001 |

* cited by examiner

*Primary Examiner*—Bibhu Mohanty
(74) *Attorney, Agent, or Firm*—Oliff & Berridge, PLC

(57) ABSTRACT

A failure diagnostic apparatus for an intake air stream control valve which is provided in an intake system for an internal combustion engine, and which forms an air stream in the combustion chamber by changing a flow of intake air when the intake air is introduced to the combustion chamber of the internal combustion engine. In the failure diagnostic apparatus, an ignition device is provided in the combustion chamber; an ECU changes ignition timing such that an engine rotational speed of the internal combustion engine becomes equal to a target rotational speed immediately after the engine is started while the engine is cold; and the ECU performs a failure diagnostic control for determining whether a failure has occurred in the intake air stream control valve based on whether the changed ignition timing is different from the reference ignition timing that is a reference for the failure diagnosis.

17 Claims, 9 Drawing Sheets

FAILURE DIAGNOSTIC APPARATUS FOR INTAKE AIR STREAM CONTROL DEVICE AND CONTROL METHOD OF FAILURE DIAGNOSTIC APPARATUS

INCORPORATION BY REFERENCE

The disclosure of Japanese Patent Application No. 2004-009242 filed on Jan. 16, 2004 including the specification, drawings and abstract is incorporated herein by reference in its entirety.

BACKGROUND OF THE INVENTION

1. Field of the Invention

The invention relates to a failure diagnostic technology, and more particularly to a failure diagnostic apparatus for an intake air stream control device provided in an intake system for the internal combustion engine.

2. Description of the Related Art

As an example of such an internal combustion engine, an internal combustion engine is known, which includes an intake air stream control device such as a swirl control valve (hereinafter, referred to as "SCV"), and a jet flow port. Also, an internal combustion engine is known, in which a swirl or a tumble flow suitable for a present operating state is formed in a combustion chamber by operating the intake air stream control device, whereby lean burn operation that is known can be performed.

More specifically, fuel in appropriate concentration is diffused to appropriate portions of the combustion chamber by forming the air stream in the combustion chamber, and this diffusion of the fuel makes a combustion state stable while only a small amount of the fuel is used.

In relation to the intake air stream control device, for example, Japanese Patent Application Publication No. JP-A-9-42021, Japanese Patent Application Publication No. JP-A-7-83101, and Japanese Patent Application Publication No. JP-A-2001-20782 disclose failure diagnostic technologies for the SCV.

According to the failure diagnostic technology disclosed in the Japanese Patent Application Publication No. JP-A-9-42021, a failure of the SCV is detected using pressure in a cylinder (hereinafter, referred to as "cylinder pressure") and an output of an air-fuel ratio sensor.

More specifically, a degree of stability of the combustion in the engine is monitored by detecting the cylinder pressure using a pressure sensor when the SCV is closed. In addition, under this situation, an air-fuel ratio is controlled to become the leanest value at which the degree of stability of the combustion in the engine can be maintained, and the leanest value is regarded as a lean limit value. When the lean limit value is leaner than a reference air-fuel ratio, it is determined that the SCV is not operated normally.

Also, according to the failure diagnostic technology disclosed in the Japanese Patent Application Publication No. JP-A-7-83101, a combustion period from when the ignition is started until when the cylinder pressure reaches a peak value is detected based on a signal of a crank angle sensor when the SCV is in a closed state or in an opened state during normal operation; an actual combustion period is detected based on a signal of a cylinder pressure sensor; and it is determined whether a failure has occurred in the SCV by comparing the combustion period detected based on the signal of the crank angle sensor to the actual combustion period.

Also, according to the failure diagnostic technology disclosed in the Japanese Patent Application Publication No. JP-A-2001-20782, a combustion state when the SCV is in the closed state and a combustion state when the SCV is in the opened state are detected, for example, based on an output value of a knock sensor; and when it is determined that the combustion state deteriorates as a result of comparison between both of the combustion states, it is determined that a failure has occurred in the SCV.

In the conventional failure diagnostic technologies, a change in the combustion state which depends on the position of a valve element of the intake air stream control device is detected by the cylinder pressure sensor or the like, and the failure diagnosis for the intake air stream control device is performed by comparing a normal change in the combustion state to the detected change in the combustion state.

Therefore, for example, when the valve element incorporated in the intake air stream control device falls off the intake air stream control device, or when the intake air stream control device remains in the opened state, it is not possible to accurately detect the change in the combustion state when the intake air stream control valve is in the closed state. Accordingly, it is necessary to additionally provide an opening degree sensor for directly detecting the position of the valve element of the intake air stream control device.

As described above, in the failure diagnostic technologies disclosed in the Japanese Patent Application Publication No. JP-A-9-42021, and the Japanese Patent Application Publication No. JP-A-7-83101, the failure diagnosis is performed by detecting the combustion state based on the output value of the cylinder pressure sensor. The cylinder pressure sensor is more expensive than other sensors, and it is necessary to perform extensive machining operation for a cylinder head when the cylinder pressure sensor is installed. Thus, it costs much, and it is troublesome to employ the conventional failure diagnostic technologies for an existing internal combustion engine. Accordingly, the conventional failure diagnostic technologies need to be further improved.

SUMMARY OF THE INVENTION

In view of the above, it is an object of the invention to provide a failure diagnostic technology for an intake air stream control device, in which a failure diagnosis for the intake air stream control device can be performed without additionally providing a sensor or the like in the intake air stream control device.

A first aspect of the invention relates to a failure diagnostic apparatus for an intake air stream control device which is provided in an intake system for an internal combustion engine, and which forms an air stream in a combustion chamber of the internal combustion engine by changing a flow of intake air when the intake air is introduced to the combustion chamber. The failure diagnostic apparatus includes an ignition device which is provided in the combustion chamber; and a controller which changes ignition timing of the ignition device such that an engine rotational speed of the internal combustion engine becomes equal to a target rotational speed under a predetermined condition, and which performs a failure diagnosis for determining whether a failure has occurred in the intake air stream control device based on whether the changed ignition timing is different from reference ignition timing that is a reference for the failure diagnosis.

In the first aspect of the invention, the intake air stream control device is provided in the intake system for the internal combustion engine. The failure diagnostic apparatus includes the ignition timing control device which changes the ignition timing such that the engine rotational speed becomes close to the target rotational speed under the predetermined condition. The ignition timing control device maintains the engine rotational speed at the target rotational speed. Also, the failure diagnostic device performs the failure diagnosis for determining whether a failure has occurred in the intake air stream control device based on whether the changed ignition timing is different from the reference ignition timing that is the reference for the failure diagnosis.

That is, according to the first aspect of the invention, the failure diagnostic apparatus compensates for a change in the engine rotational speed due to a failure of the intake air stream control device by changing the ignition timing, and performs the failure diagnosis for the intake air stream control device based on a manner in which the ignition timing is controlled at the time of compensation. That is, when a failure has occurred in the intake air stream control device, the combustion state of the internal combustion engine deteriorates, and the engine rotational speed decreases. In this case, the ignition timing control device maintains the engine rotational speed at the target rotational speed by changing the ignition timing. Accordingly, the failure diagnosis for the intake air stream control device can be performed based on a degree by which the ignition timing is changed.

Thus, according to the invention, it is possible to provide the failure diagnostic technology for the intake air stream control device, in which the failure diagnosis for the intake air stream control device can be performed without additionally providing a sensor or the like in the intake air stream control device.

In the first aspect of the invention, the intake air stream control device may be a valve which is provided in an intake passage for the internal combustion engine, and which blocks a part of the intake passage.

In the first aspect of the invention, the intake system may include a bypass passage which is independent of an intake passage for the internal combustion engine, and which provides communication between a portion upstream of a throttle valve provided in the intake passage and an intake port; and the intake air control device may be a valve which is provided in the bypass passage, and which adjusts a flow rate of the intake air flowing in the bypass passage.

In the first aspect of the invention, the controller may perform compensation such that the engine rotational speed becomes equal to the target rotational speed by advancing the ignition timing in a case where the engine rotational speed is lower than the target rotational speed under the predetermined condition when the air stream is formed; and the controller may determine that a failure has occurred in the intake air stream control device in a case where the ignition timing after the compensation is advanced compared to the reference ignition timing.

When a failure has occurred in the intake air stream control device, an appropriate air stream is not formed in the combustion chamber, and a combustion speed decreases. Therefore, in order to prevent a decrease in the engine rotational speed due to the decrease in the combustion speed, the ignition timing control device maintains the engine rotational speed at the target rotational speed by advancing the ignition timing so as to increase the combustion speed. Accordingly, the failure diagnostic device determines that a failure has occurred in the intake air stream control device in the case where the ignition timing is advanced.

In the first aspect of the invention, the ignition timing control device may change the ignition timing under the predetermined condition that the engine has just been started while the engine is cold. With the configuration, the warming-up operation that is performed immediately after the engine is started while the engine is cold, that is, so-called "first idling" is used to perform the failure diagnosis for the intake air stream control device.

In the first aspect of the invention, the intake air stream control device may be a valve which opens and closes the intake system; and the controller may determine that an open failure has occurred in the valve in the case where the ignition timing after the compensation is advanced compared to the reference ignition timing.

In the first aspect of the invention, the intake air stream control device may be a valve which opens and closes the intake system; the controller may perform compensation such that the engine rotational speed becomes equal to the target rotational speed by advancing the ignition timing in a case where the engine rotational speed is lower than the target rotational speed under the predetermined condition when the air stream is formed, and the controller may determine that an open failure has occurred in the valve in a case where the ignition timing after the compensation is advanced compared to first reference ignition timing; and the controller may perform compensation such that the engine rotational speed becomes equal to the target rotational speed by delaying the ignition timing in a case where the engine rotational speed is higher than the target rotational speed under the predetermined condition when the air stream is not formed, and the controller may determine that a close failure has occurred in the valve in a case where the ignition timing after the compensation is delayed compared to second reference ignition timing.

In the first aspect of the invention, the controller may accumulate a value of the ignition timing for a predetermined time period from when the intake air stream control device starts to be operated; the controller may calculate an average value of the ignition timing during the predetermined time period based on the predetermined time period and an accumulated value of the ignition timing; and the controller may perform the failure diagnosis for determining whether a failure has occurred in the intake air stream control device by comparing the average value of the ignition timing and the reference ignition timing.

In the first aspect of the invention, the controller may change the ignition timing under the predetermined condition that the engine has just been started while the engine is cold.

In the first aspect of the invention, the controller may perform feedback control of the ignition timing such that the engine rotational speed of the internal combustion engine becomes equal to the target rotational speed.

A second aspect of the invention relates to a failure diagnostic method for an intake air stream control device which is provided in an intake system for an internal combustion engine, and which forms an air stream in a combustion chamber of the internal combustion engine by changing a flow of intake air when the intake air is introduced to the combustion chamber. The failure diagnostic method includes the steps of: changing ignition timing of an ignition device which is provided in the combustion chamber such that an engine rotational speed of the internal combustion engine becomes equal to a target rotational speed under a predetermined condition; and performing a failure diagnosis for determining whether a failure has occurred in the intake air stream control device based on whether the changed ignition timing is different from reference ignition timing that is a reference for the failure diagnosis.

In the second aspect of the invention, compensation may be performed such that the engine rotational speed becomes equal to the target rotational speed by advancing the ignition timing in a case where the engine rotational speed is lower than the target rotational speed under the predetermined condition when the air stream is formed; and it may be determined that a failure has occurred in the intake air stream control device in a case where the ignition timing after the compensation is advanced compared to the reference ignition timing.

In the second aspect of the invention, the intake air stream control device may be a valve which opens and closes the intake system; and it may be determined that an open failure has occurred in the valve in the case where the ignition timing after the compensation is advanced compared to the reference ignition timing.

In the second aspect of the invention, the intake air stream control device may be a valve which opens and closes the intake system; compensation may be performed such that the engine rotational speed becomes equal to the target rotational speed by advancing the ignition timing in a case where the engine rotational speed is lower than the target rotational speed under the predetermined condition when the air stream is formed, and it may be determined that an open failure has occurred in the valve in a case where the ignition timing after the compensation is advanced compared to first reference ignition timing; and compensation may be performed such that the engine rotational speed becomes equal to the target rotational speed by delaying the ignition timing in a case where the engine rotational speed is higher than the target rotational speed under the predetermined condition when the air stream is not formed, and it may be determined that a close failure has occurred in the valve in a case where the ignition timing after the compensation is delayed compared to second reference ignition timing.

In the second aspect of the invention, a value of the ignition timing may be accumulated for a predetermined time period from when the intake air stream control device starts to be operated; an average value of the ignition timing during the predetermined time period may be calculated based on the predetermined time period and an accumulated value of the ignition timing; and the failure diagnosis for determining whether a failure has occurred in the intake air stream control device may be performed by comparing the average value of the ignition timing and the reference ignition timing.

In the second aspect of the invention, the ignition timing may be changed under the predetermined condition that the engine has just been started while the engine is cold.

In the second aspect of the invention, feedback control of the ignition timing may be performed such that the engine rotational speed of the internal combustion engine becomes equal to the target rotational speed.

A third aspect of the invention relates to a failure diagnostic apparatus for an intake air stream control device which is provided in an intake system for an internal combustion engine, and which forms an air stream in a combustion chamber of the internal combustion engine by changing a flow of intake air when the intake air is introduced to the combustion chamber. The failure diagnostic apparatus includes ignition device which is provided in the combustion chamber; ignition timing control means for changing ignition timing of the ignition device such that an engine rotational speed of the internal combustion engine becomes equal to a target rotational speed under a predetermined condition; and failure diagnostic means for performing a failure diagnosis for determining whether a failure has occurred in the intake air stream control device based on whether the changed ignition timing is different from reference ignition timing that is a reference for the failure diagnosis.

The intake air stream control device according to the invention includes any device including a valve element which changes the flow of intake air by narrowing a part of an intake passage, or blocking a part of the intake passage, and any device having a structure which can change the flow of intake air in the combustion chamber such as a device including a port for injecting air and the like into a combustion chamber to form an air stream, which is provided around an intake valve.

The aforementioned means may be combined within the spirit and the scope of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, an exemplary embodiment of the invention will be described with reference to the accompanying drawings.

Figure 1:
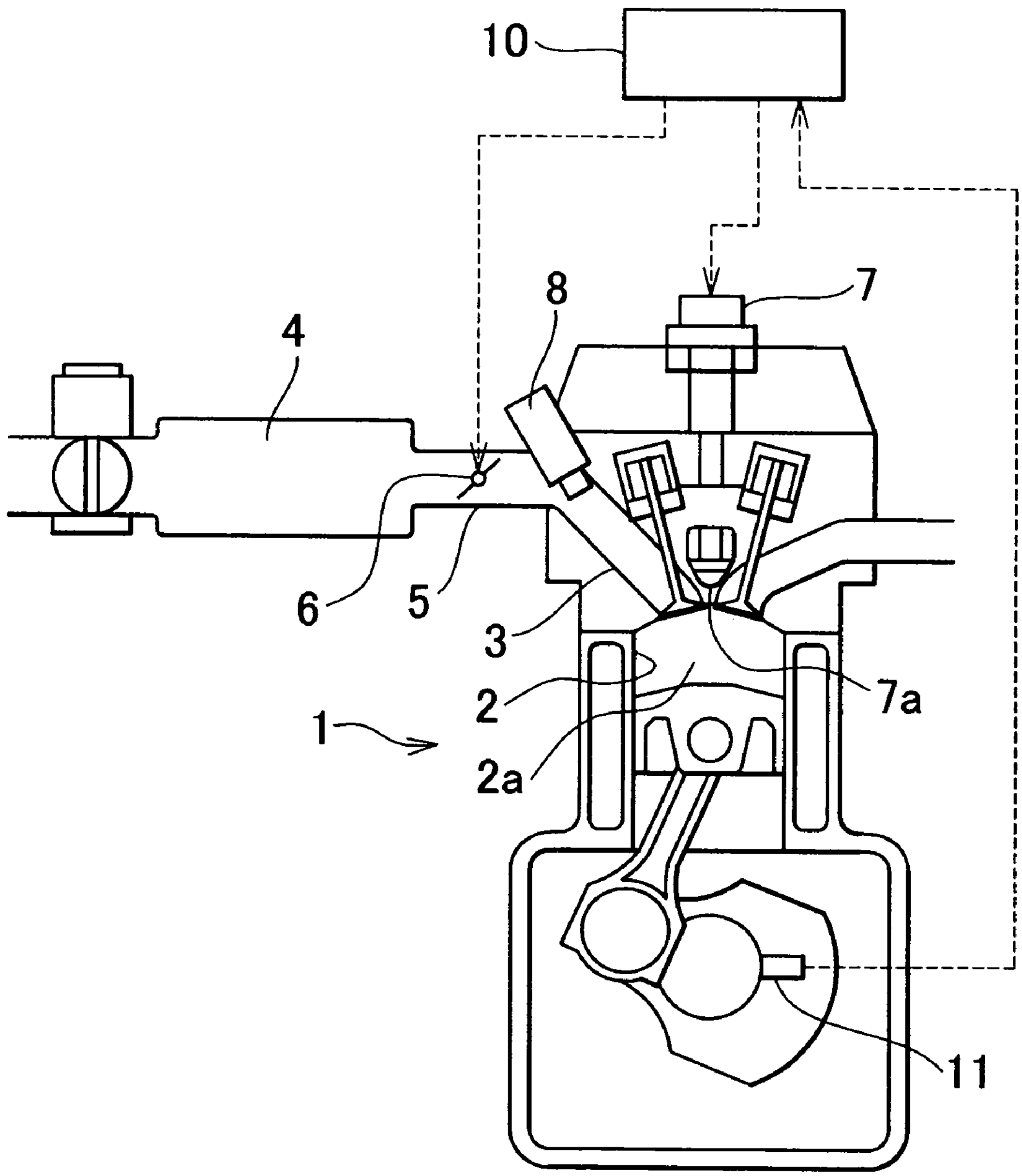
FIG. 1 is a cross sectional view showing a lean burn gasoline engine in an embodiment of the invention.

An internal combustion engine 1 shown in FIG. 1 is a four-cylinder lean burn gasoline engine. A set of intake ports 3 are provided in parallel in a combustion chamber 2*a* of each cylinder 2. Intake air (fresh air) is supplied to each intake port 3 through a surge tank 4 and an intake manifold 5. An intake air stream control valve 6, which is an intake air stream control device according to the invention, is provided in the intake manifold 5 leading to one of the intake ports 3.

The intake air stream valve 6 can be operated between an opened position and a closed position so as to be opened/closed by an ECU 10. When the intake air stream control valve 6 is opened, intake air is supplied to the combustion chamber 2*a* through both of the intake air pots 3 which are connected to the combustion chamber 2*a*.

When the intake air stream control valve 6 is in the closed state, intake air is supplied to the combustion chamber 2*a* mainly through the other port 3 in which the intake air stream control valve 6 is not provided.

Figure 2:
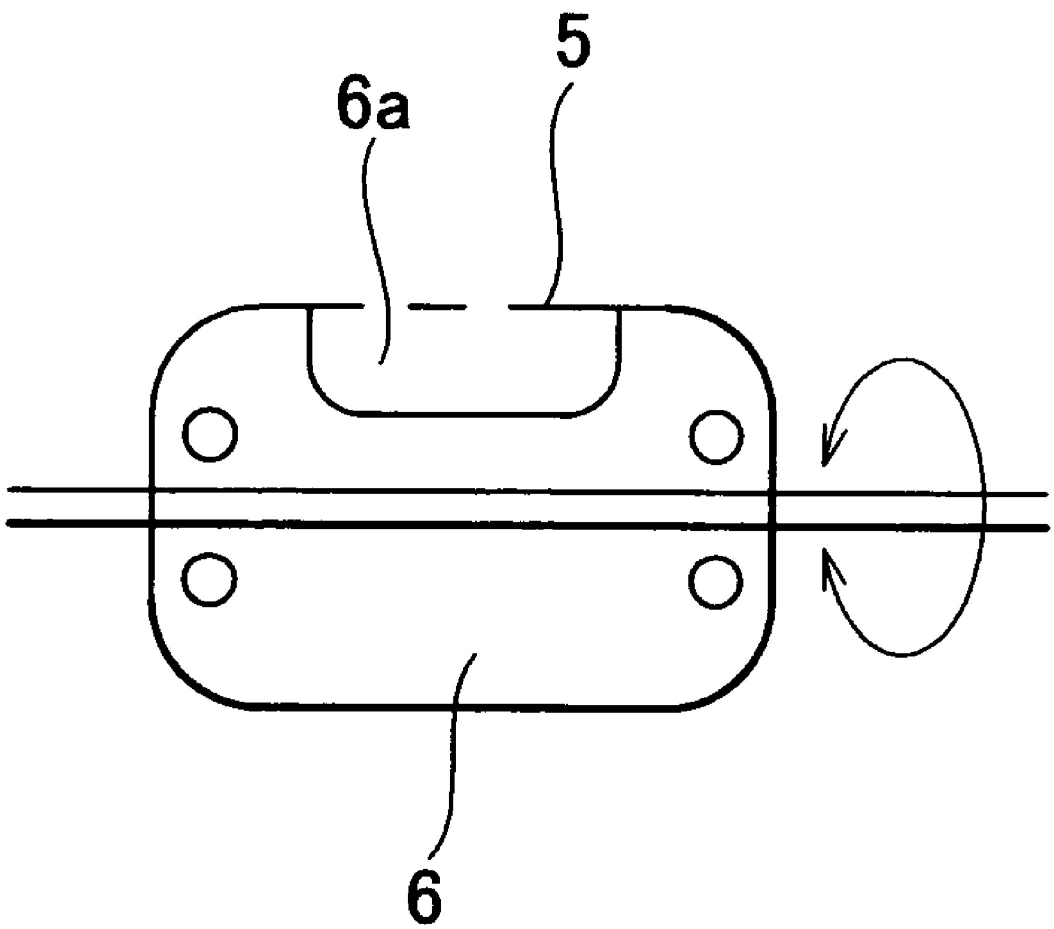
FIG. 2 is a front view showing an intake air stream control valve according to the embodiment of the invention.

As shown in FIG. 2, a notch 6*a* which is formed in an upper portion of the intake air stream control valve 6. When the intake air stream control valve 6 is in the closed state, the intake air which flows into the combustion chamber 2*a* through the notch 6*a* of the intake air stream control valve 6 forms a tumble flow in the combustion chamber 2*a*. The tumble flow turns in a height direction of the combustion chamber 2*a*. Further, the intake air which flows into the combustion chamber 2*a* through the other intake port 3 turns along an inner wall surface of the combustion chamber 2*a*, whereby a swirl is formed in the combustion chamber 2*a*.

A fuel injection valve 8 for injecting fuel into the combustion chamber 2*a*, and an ignition plug 7*a* for burning the fuel together with the intake air (fresh air) taken from an intake system are provided in each combustion chamber 2*a*. Further, an ignition device 7 for applying high voltage is connected to each ignition plug 7*a*.

An ignition signal is output to each ignition device 7 at timing suitable for a present operating state while an electronic control unit (hereinafter, referred to as "ECU") 10 provided in a control system of the internal combustion engine 1 performs monitoring. Each ignition device 7 receives the ignition signal, and applies the high voltage to the ignition plug 7*a*.

A crank angle sensor 11 for detecting a rotational speed of an internal combustion engine is electrically connected to the ECU 10. The ECU 10 is electrically connected to the intake air stream control valve 6 and the ignition device 7, so that the ECU 10 can control the intake air stream control valve 6 and the ignition device 7.

In the internal combustion engine 1 having the configuration described above, diffusion of the fuel in appropriate concentration to appropriate portions is promoted by forming the air stream, and flame is efficiently propagated by the appropriate diffusion of the fuel, whereby lean burn is realized in the internal combustion engine 1. Therefore, when an appropriate air stream cannot be formed in the combustion chamber 2*a* due to a failure of the intake air stream control valve 6, the combustion speed decreases, and the engine rotational speed changes.

Accordingly, the ECU 10 monitors an engine rotational speed and ignition timing, and performs a feedback control using the engine rotational speed and the ignition timing as parameters, thereby applying the ignition signal to each ignition device 7 at timing that is presently required. Thus, the operating state can be made stable.

For example, when warming-up operation is performed immediately after the engine is started while the engine is cold, the ECU 10 performs the feedback control using the engine rotational speed and the ignition timing as the parameters so as to maintain the engine rotational speed at a target rotational speed.

Figure 3:
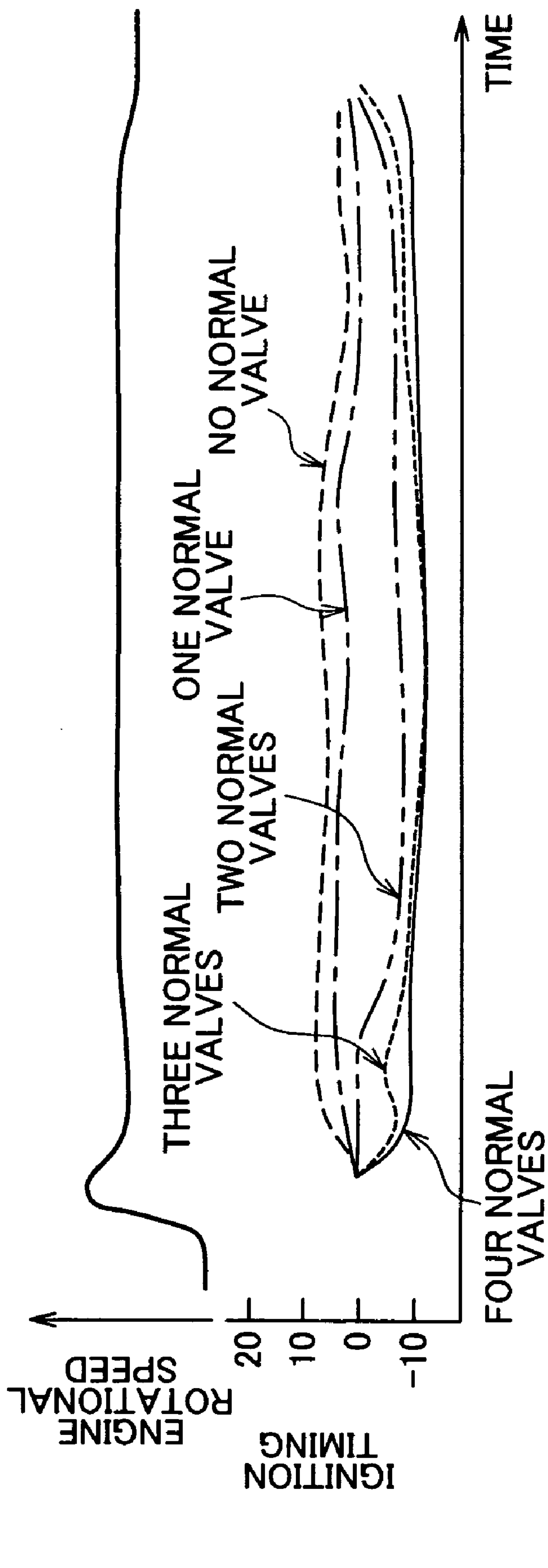
FIG. 3 is a time chart showing time-dependent changes in the ignition timing and the engine rotational speed.

FIG. 3 is a time chart showing time-dependent changes in the ignition timing and the engine rotational speed.

In FIG. 3, the description of "four normal valves" indicates a case where the intake air stream control valves 6 corresponding to all of the four cylinders are normally operated. The description of "three normal valves" and description of "two normal valves" indicate a case where the intake air stream control valves 6 corresponding to any three of the four cylinders are normally operated, and a case where the intake air stream control valves 6 corresponding to any two of the four cylinders are normally operated, respectively. The description of "one normal valve" indicates a case where the intake air stream control valve 6 corresponding to any one of the four cylinders is normally operated. The description of "no normal valve" indicates a case where none of the intake air stream control valves 6 corresponding to all of the four cylinders are normally operated.

Thus, as the number of the intake air stream control valves 6 which are not operated normally increases, the ignition timing is advanced.

More specifically, the engine rotational speed is detected based on the output of the crank angle sensor 11, and the detected rotational speed is compared to the target rotational speed at the time of warming-up operation. For example, when the engine rotational speed is lower than the target rotational speed, the combustion speed is increased by advancing the ignition timing so that the engine rotational speed becomes close to the target rotational speed.

Figure 4:
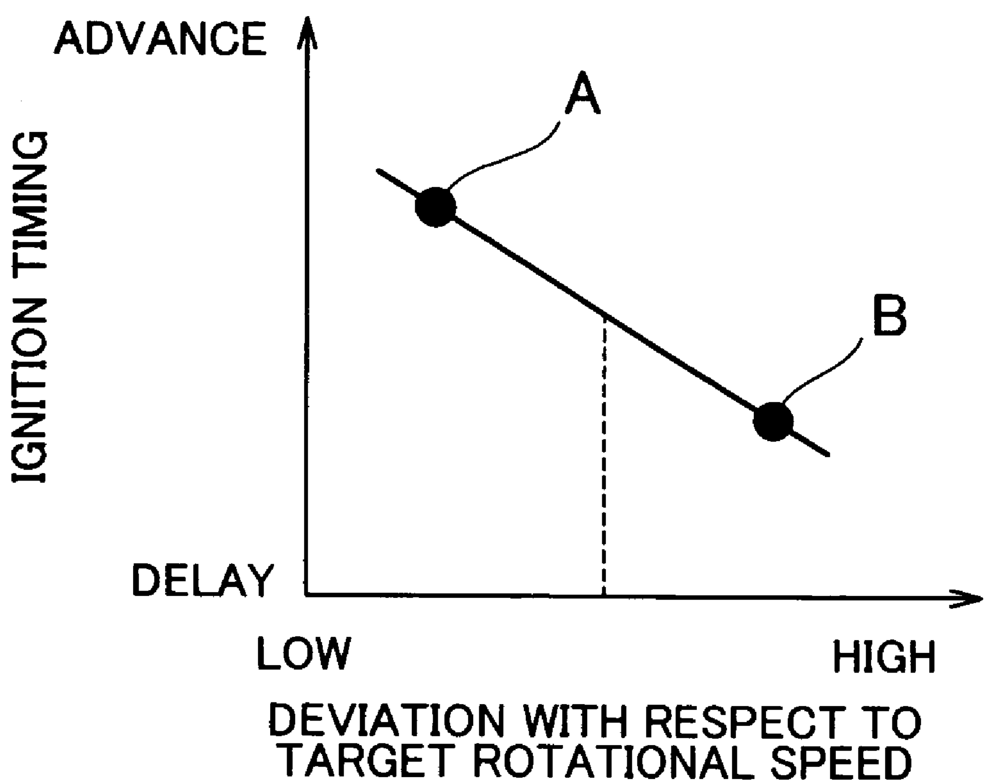
FIG. 4 is a graph showing the correlation between a deviation of an actual engine rotational speed with respect to a target rotational speed, and ignition timing.
Figure 5:
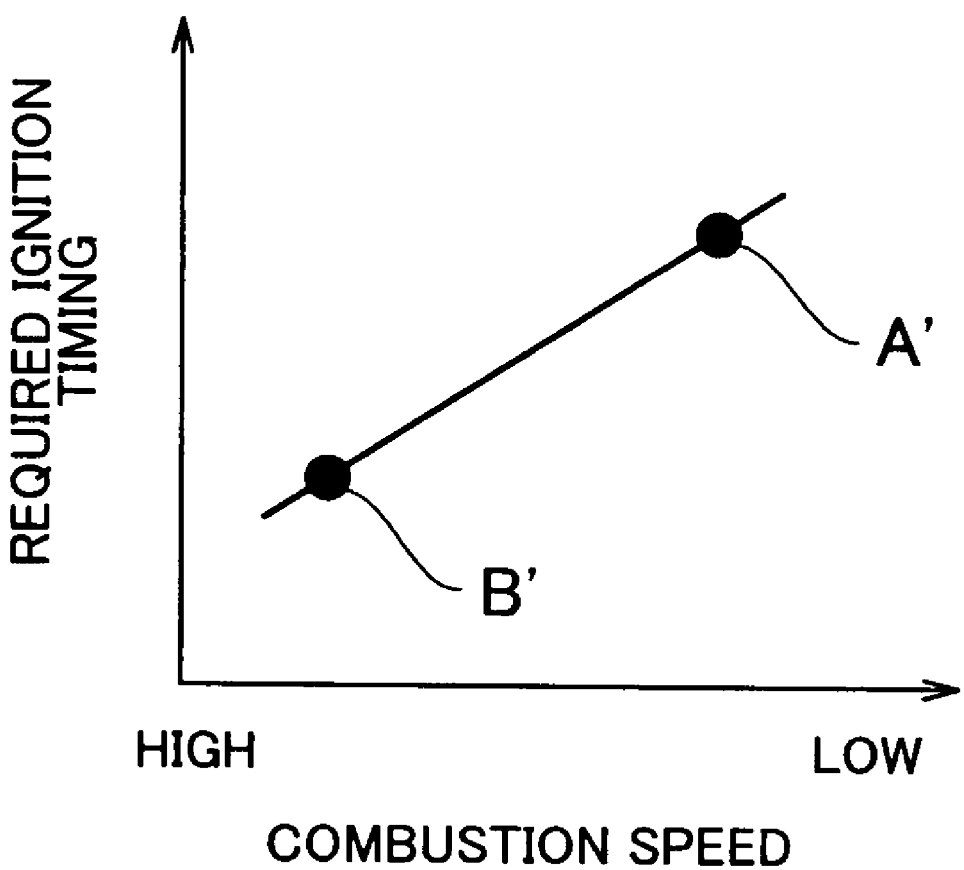
FIG. 5 is a graph showing the correlation between a combustion speed and ignition timing required for obtaining the target rotational speed.

Hereinafter, the correlation between the engine rotational speed and the ignition timing will be described in detail with reference to FIG. 4 and FIG. 5 When the engine rotational speed becomes lower than the target rotational speed due to a decrease in the combustion speed, the ECU 10 advances the ignition timing (required ignition timing) so as to improve the decrease in the combustion speed (refer to a point A in FIG. 4, and a point A' in FIG. 5). When the combustion speed is high, since the engine rotational speed is higher than the target rotational speed, the ECU 10 delays the ignition timing so as to decrease the combustion speed (refer to a point B in FIG. 4 and a point B' in FIG. 5).

Thus, the ECU 10 advances and delays the ignition timing according to a present combustion state in order to compensate for the change in the engine rotational speed, whereby the target engine rotational speed is achieved. Hereinafter, the aforementioned feedback control will be referred to as "rotational speed compensation control".

Failure Diagnostic Control

Figure 7:
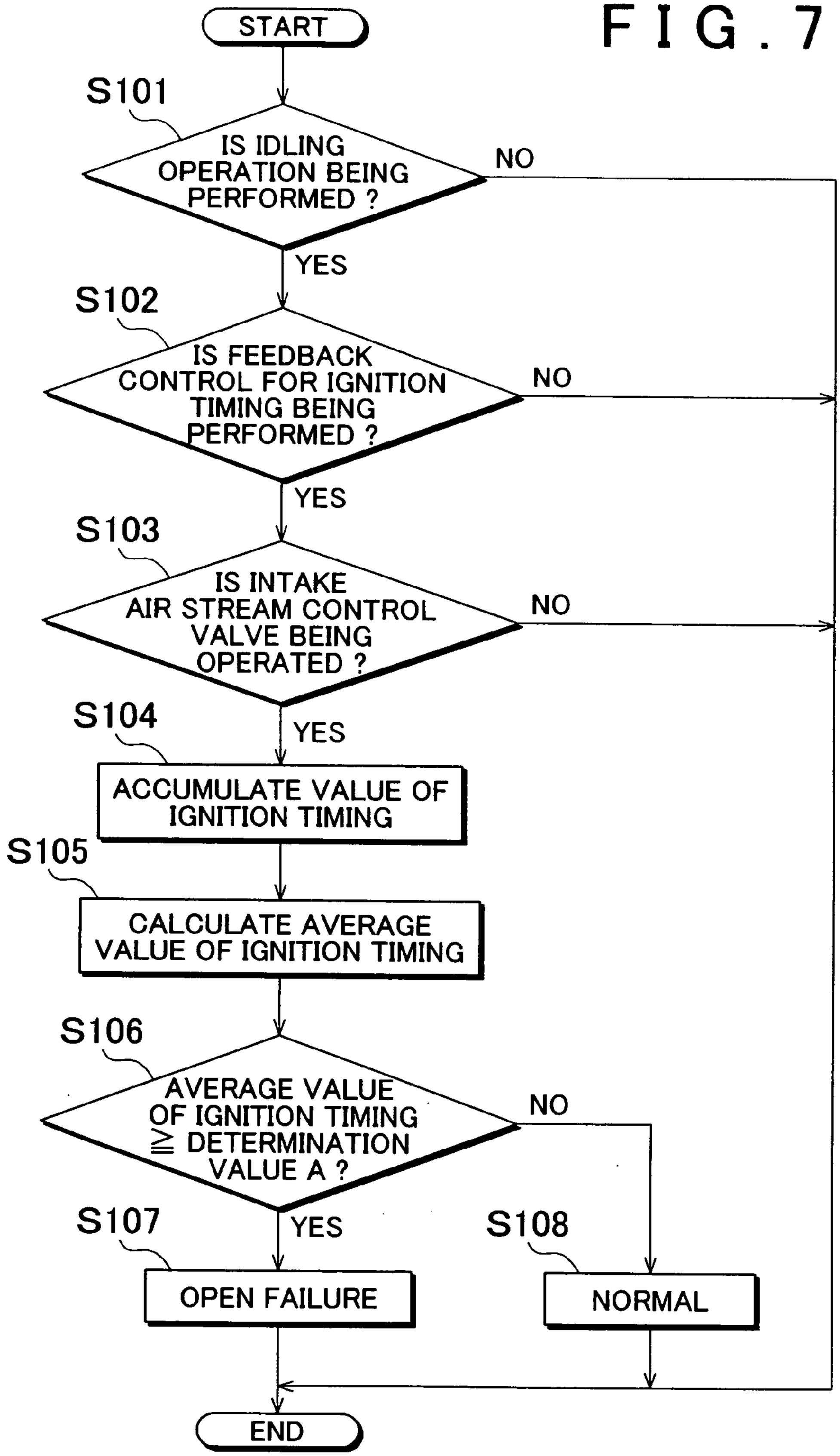
FIG. 7 is a flowchart showing processes of a failure diagnostic control according to the embodiment of the invention.

Next, a failure diagnostic control for the intake air stream control valve 6 will be described with reference to FIG. 7. In this embodiment, the ECU 10 for performing the failure diagnostic control, the ignition device 7, and the like constitute the various means and devices described in claims of the invention.

In step S101, the ECU 10 determines whether idling operation (warming-up operation) is being performed immediately after the engine is started while the engine is cold. This determination is made based on whether the engine rotational speed detected by the crank angle sensor 11 is in a predetermined range.

When an affirmative determination is made in step S101, the routine proceeds to step S102. When a negative determination is made in step S101, the routine is terminated.

In step S102, the ECU 10 determines whether the feedback control for the ignition timing is being performed.

This determination is made based on whether the aforementioned rotational speed compensation control in which the ignition timing is changed is being performed.

When an affirmative determination is made in step S102, the routine proceeds to step S103. When a negative determination is made, the routine is terminated in step S102, the routine is terminated.

In step S103, the ECU 10 determines whether a control for closing the intake air stream control valve 6 is being performed. That is, the ECU 10 determines whether a command for operating the intake air stream control valve 6 is being issued.

When an affirmative determination is made in step S103, the routine proceeds to step S104. When a negative determination is made in step S103, the routine is terminated.

In step S104, a value of the ignition timing of the ignition device 7 is accumulated, for example, for 15 seconds from when the intake air stream control valve 6 starts to be operated. The value of the ignition timing may start to be obtained immediately after the process in step S104 is performed, or may be variously changed according to various specifications.

In step S105, an average value of the ignition timing is calculated based on the accumulated value of the obtained ignition timing, and an elapsed time period from when the intake air stream control valve 6 starts to be operated (for example, 15 seconds).

In step S106, the ECU 10 determines whether the average value of the ignition timing is equal to or greater than a determination value A.

Figure 6:
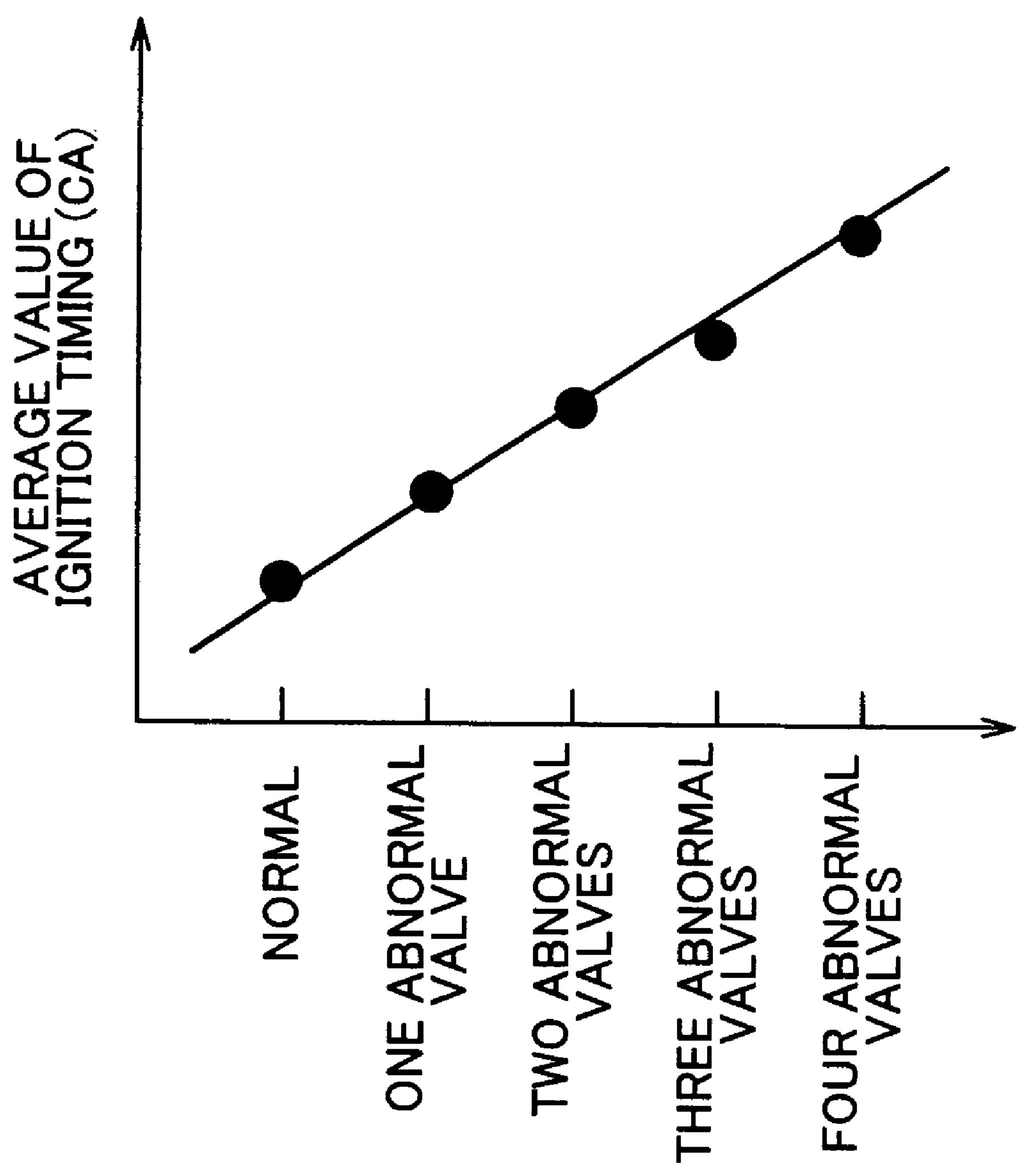
FIG. 6 is a graph in which a horizontal axis indicates an operating state of the intake air stream control valve corresponding to each cylinder, and a vertical axis indicates an average value of the ignition timing.

In FIG. 6, a horizontal axis indicates the operating state of the intake air stream control valve 6 corresponding to each cylinder. A vertical axis indicates the average value of the ignition timing.

The description of "normal" in the horizontal axis indicates a case where the intake air stream control valves 6 corresponding to all of the cylinders 2 are normally operated (closed). The description "one abnormal valve" indicates a case where a failure has occurred in one of the intake air stream control valves 6, that is, one of the intake air stream control valves 6 remains opened. Similarly, the description "two abnormal valves" indicates a case where a failure has occurred in two of the intake air stream controls valves 6, that is, two of the intake air stream control valves 6 remain opened. The description "three abnormal valves" indicates a case where a failure has occurred in three of the intake air stream control valves 6, that is, three of the intake air stream control valves 6 remain opened. The description "four abnormal valves" indicates a case where a failure has occurred in four of the intake air stream control valves 6, that is, four of the intake air stream control valves 6 remain opened.

Thus, when at least one of the intake air stream control valves 6 is not operated, the ignition timing is advanced. As the number of the intake air stream control valves 6 which are not operated normally increases, the angle by which the ignition timing is advanced increases.

Thus, based on the average value of the ignition timing and the relation shown in FIG. 6, it can be determined whether each of the intake air stream control valves 6 is operated, and further, the number of the intake air stream control valves 6 which are not operated normally can be determined.

The aforementioned determination value A is the average value of the ignition timing corresponding to the case indicated by the description "one abnormal valve" in FIG. 6.

When an affirmative determination is made in step S106, the routine proceeds to step S107. When a negative determination is made in step S106, the routine proceeds to step S108.

In step S107, it is determined that at least one of the intake air stream valves 6 is not operated and remains opened, that is, at least one of the intake air stream valves 6 is not closed. In other words, in step S107, it is determined that an open failure has occurred in at least one of the intake air stream valves 6.

In step S108, it is determined that all of the intake air stream control valve 6 are normally operated.

Thus, in this embodiment, a change in the engine rotational speed due to the failure of the intake air stream control valve 6 is compensated for by changing the ignition timing. Also, it is determined whether a failure has occurred in at least one of the intake air stream control valves 6 based on whether the ignition timing is advanced when the compensation is performed.

The aforementioned embodiment is an exemplary embodiment of the invention. Detailed portions thereof may be variously changed according to various specifications.

In this embodiment, an air stream is formed in the combustion chamber 2_a_ by opening and closing the intake air stream control valve 6 provided in the intake manifold 5 anterior to the intake port 3. However, the invention is not limited to this embodiment. For example, a failure diagnostic technology according to the invention is effective also in an internal combustion engine which includes a jet flow port 24 for forming a swirl around an intake valve 20 as the intake air stream control device, and in which the swirl is formed around the intake valve 20 through the jet flow port 24 when the intake air is introduced, whereby a large air stream is formed in the combustion chamber 2_a_.

Figure 8B:
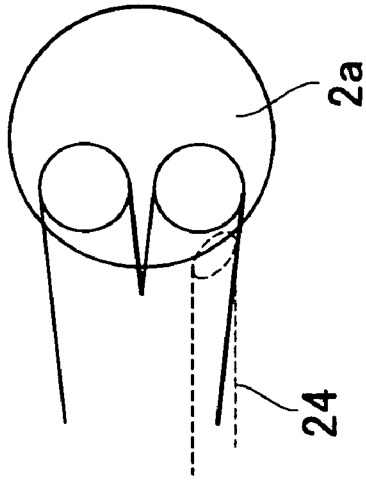
FIG. 8A and FIG. 8B show another internal combustion engine to which the embodiment of the invention can be applied, FIG. 8A being a longitudinal sectional view, and FIG. 8B being a cross sectional view.
Figure 8A:
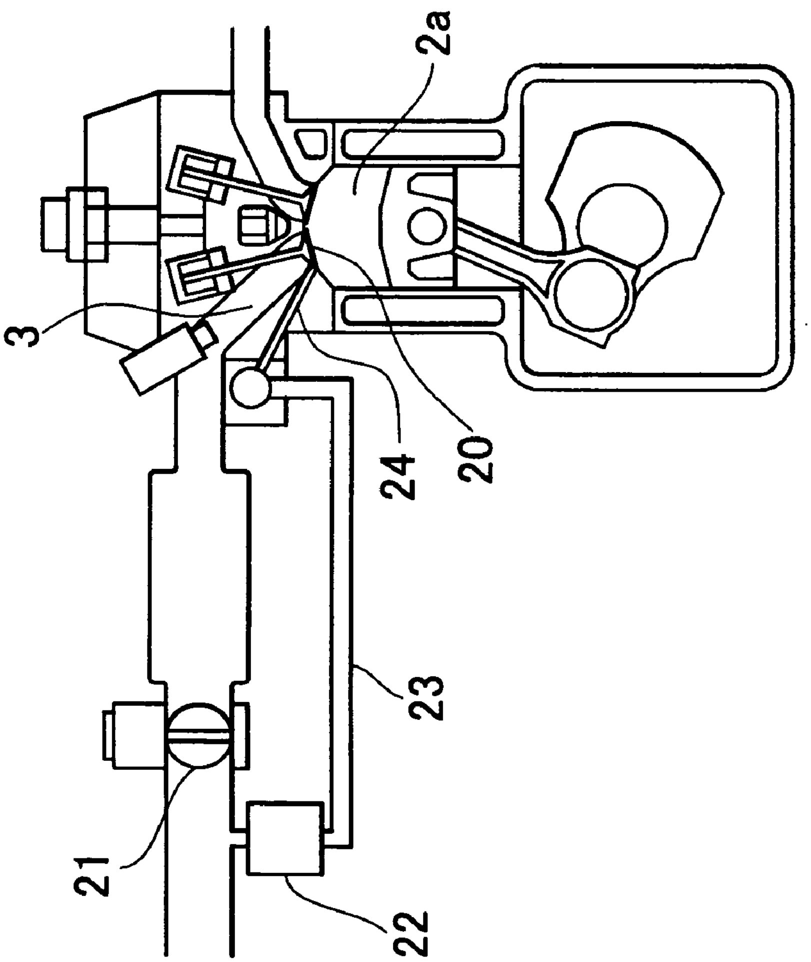

FIG. 8A and FIG. 8B show another internal combustion engine to which this embodiment can be applied. FIG. 8A is a longitudinal sectional view, and FIG. 8B is a cross sectional view.

Communication is provided between a portion upstream of a throttle valve 21 and the intake port 3 by a bypass passage 23 and the jet flow port 24. In the bypass passage 23, an idle speed control valve 22 (hereinafter, referred to as "ISCV 22") is provided. Thus, the flow rate of the intake air flowing in the bypass passage 23 can be adjusted.

The failure diagnostic technology according to the invention can be employed also in this internal combustion engine when a failure diagnosis for the ISCV 22 is performed.

In the aforementioned failure diagnostic control, when the ignition timing after compensation is advanced compared to reference ignition timing, it is determined that the open failure has occurred in the intake air stream control valve 6. However, the reference ignition timing (determination value) which is a reference for the failure diagnosis when the intake air stream control valve 6 is in the opened state, and the reference ignition timing when the intake air stream control valve 6 is in the closed state may be set separately. That is, when the failure diagnosis for the intake air stream control valve 6 is performed, it may be determined whether the command for opening the intake air stream control valve 6 is being issued, or the command for closing the intake air stream control valve 6 is being issued, the reference ignition timing (determination value) which should be employed for the failure diagnosis may be selected, and the failure of the intake air stream control valve 6 may be detected based on the difference between the average value of the ignition timing and the reference ignition timing.

Figure 9:
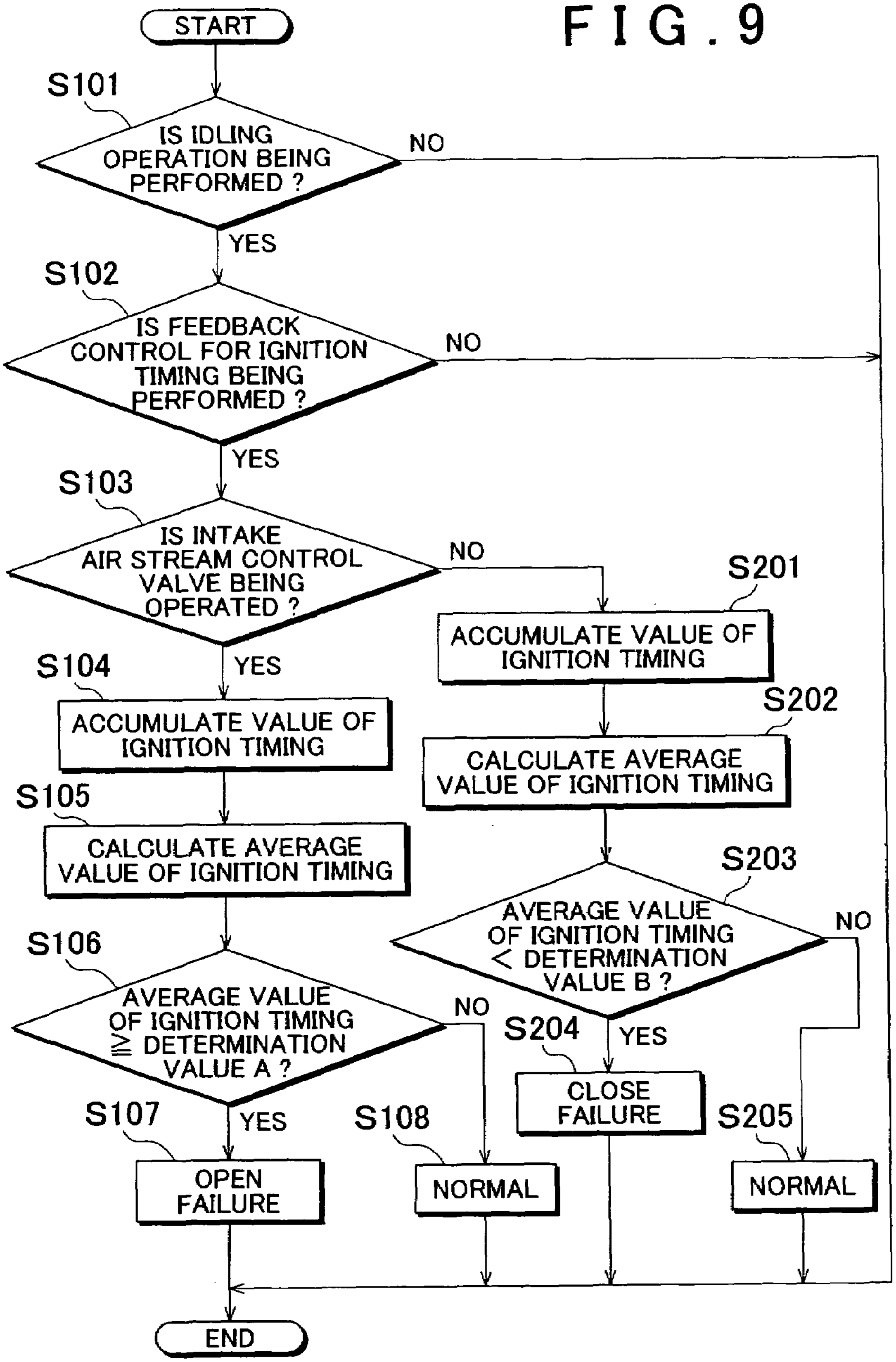
FIG. 9 is a flowchart explaining processes of a failure diagnostic control according to a modified example of the embodiment.

FIG. 9 is a flowchart showing processes of a failure diagnostic control in the case where the reference ignition timing when the intake air stream control valve 6 is in the opened state and the reference ignition timing when the intake air stream control valve 6 is in the closed state are separately set. In this flowchart, the same processes as those in FIG. 7 are denoted by the same reference numerals, and only processes different from those in the aforementioned failure diagnostic control will be described in detail.

That is, only processes in step S201 and subsequent steps, which are performed after a negative determination is made in step S103, will be described in detail.

In step S201, the ECU 10 accumulates the value of the ignition timing of the ignition device 7, for example, for 15 seconds from when the intake air stream control valve 6 starts to be operated. In step S201, the same process as that in the aforementioned step S104 is performed.

In step S202, the ECU 10 calculates the average value of the ignition timing based on the accumulated value of the obtained ignition timing and the elapsed time period (for example, 15 seconds) from when the intake air stream control valve 6 starts to be operated. In step S202, the same process as that in the aforementioned step S105 is performed.

In step S203, the ECU 10 determines whether the average value of the ignition timing is less than a determination value B. The determination value B is the value of the ignition timing that is obtained in the case where all of the intake air stream control valves 6 are opened, that is, in the case where all of the intake air stream control valves 6 are normal.

When an affirmative determination is made in step S203, the routine proceeds to step S204. When a negative determination is made in step S203, the routine proceeds to step S205.

In step S204, it is determined that at least one of the intake air stream control valves 6 is not operated and remains closed, that is, at least one of the intake air stream control valves 6 is not opened. In other words, in step S204, it is determined that a close failure has occurred in at least one of the intake air stream control valves 6.

In step S205, it is determined that all of the intake air stream control valves 6 are normally operated.

Since the combustion state when the intake air stream control valve 6 is in the closed state is somewhat different from the combustion state when the intake air stream control valve 6 is in the opened state, the reference ignition timing (determination value) which is the reference for the failure diagnosis when the intake air stream control valve 6 is in the closed state and the reference ignition timing when the intake air stream control valve 6 is in the opened state are set separately. Therefore, the failure diagnosis for the intake air stream control valve 6 can be performed with high accuracy both when the intake air stream control valve 6 is in the closed state and in the opened state.

As described so far, in the internal combustion engine 1 in this embodiment, the failure diagnosis for the intake air stream control valve 6 can be performed without additionally providing a sensor or the like in the intake air stream control valve 6.

What is claimed is:

1. A failure diagnostic apparatus for an intake air stream control device which is provided in an intake system for an internal combustion engine, and which forms an air stream in a combustion chamber of the internal combustion engine by changing a flow of intake air when the intake air is introduced to the combustion chamber, the failure diagnostic apparatus comprising:

an ignition device which is provided in the combustion chamber; and a controller which changes ignition timing of the ignition device such that an engine rotational speed of the internal combustion engine becomes equal to a target rotational speed under a predetermined condition, and which performs a failure diagnosis for determining whether a failure has occurred in the intake air stream control device based on whether the changed ignition timing is different from reference ignition timing that is a reference for the failure diagnosis.

2. The failure diagnostic apparatus according to claim 1, wherein the intake air stream control device is a valve which is provided in an intake passage for the internal combustion engine, and which blocks a part of the intake passage.

3. The failure diagnostic apparatus according to claim 1, wherein the intake system includes a bypass passage which is independent of an intake passage for the internal combustion engine, and which provides communication between a portion upstream of a throttle valve provided in the intake passage and an intake port; and the intake air control device is a valve which is provided in the bypass passage, and which adjusts a flow rate of the intake air flowing in the bypass passage.

4. The failure diagnostic apparatus according to claim 1, wherein the controller performs compensation such that the engine rotational speed becomes equal to the target rotational speed by advancing the ignition timing in a case where the engine rotational speed is lower than the target rotational speed under the predetermined condition when the air stream is formed; and the controller determines that a failure has occurred in the intake air stream control device in a case where the ignition timing after the compensation is advanced compared to the reference ignition timing.

5. The failure diagnostic apparatus according to claim 4, wherein the intake air stream control device is a valve which opens and closes the intake system; and the controller determines that an open failure has occurred in the valve in the case where the ignition timing after the compensation is advanced compared to the reference ignition timing.

6. The failure diagnostic apparatus according to claim 1, wherein the intake air stream control device is a valve which opens and closes the intake system;

the controller performs compensation such that the engine rotational speed becomes equal to the target rotational speed by advancing the ignition timing in a case where the engine rotational speed is lower than the target rotational speed under the predetermined condition when the air stream is formed, and the controller determines that an open failure has occurred in the valve in a case where the ignition timing after the compensation is advanced compared to first reference ignition timing; and the controller performs compensation such that the engine rotational speed becomes equal to the target rotational speed by delaying the ignition timing in a case where the engine rotational speed is higher than the target rotational speed under the predetermined condition when the air stream is not formed, and the controller determines that a close failure has occurred in the valve in a case where the ignition timing after the compensation is delayed compared to second reference ignition timing.

7. The failure diagnostic apparatus according to claim 1, wherein the controller accumulates a value of the ignition timing for a predetermined time period from when the intake air stream control device starts to be operated; the controller calculates an average value of the ignition timing during the predetermined time period based on the predetermined time period and an accumulated value of the ignition timing; and the controller performs the failure diagnosis for determining whether a failure has occurred in the intake air stream control device by comparing the average value of the ignition timing and the reference ignition timing.

8. The failure diagnostic apparatus according to claim 1, wherein the controller changes the ignition timing under the predetermined condition that the engine has just been started while the engine is cold.

9. The failure diagnostic apparatus according to claim 1, wherein the controller performs feedback control of the ignition timing such that the engine rotational speed of the internal combustion engine becomes equal to the target rotational speed.

10. A failure diagnostic method for an intake air stream control device which is provided in an intake system for an internal combustion engine, and which forms an air stream in a combustion chamber of the internal combustion engine by changing a flow of intake air when the intake air is introduced to the combustion chamber, the diagnostic method comprising the steps of:

changing ignition timing of an ignition device which is provided in the combustion chamber such that an engine rotational speed of the internal combustion engine becomes equal to a target rotational speed under a predetermined condition; and performing a failure diagnosis for determining whether a failure has occurred in the intake air stream control device based on whether the changed ignition timing is different from reference ignition timing that is a reference for the failure diagnosis.

11. The failure diagnostic method according to claim 10, wherein compensation is performed such that the engine rotational speed becomes equal to the target rotational speed by advancing the ignition timing in a case where the engine rotational speed is lower than the target rotational speed under the predetermined condition when the air stream is formed; and it is determined that a failure has occurred in the intake air stream control device in a case where the ignition timing after the compensation is advanced compared to the reference ignition timing.

12. The failure diagnostic method according to claim 11, wherein the intake air stream control device is a valve which opens and closes the intake system; and it is determined that an open failure has occurred in the valve in the case where the ignition timing after the compensation is advanced compared to the reference ignition timing.

13. The failure diagnostic method according to claim 11, wherein the intake air stream control device is a valve which opens and closes the intake system;

compensation is performed such that the engine rotational speed becomes equal to the target rotational speed by advancing the ignition timing in a case where the engine rotational speed is lower than the target rotational speed under the predetermined condition when the air stream is formed, and it is determined that an open failure has occurred in the valve in a case where the ignition timing after the compensation is advanced compared to first reference ignition timing; and compensation is performed such that the engine rotational speed becomes equal to the target rotational speed by delaying the ignition timing in a case where the engine rotational speed is higher than the target rotational speed under the predetermined condition when the air stream is not formed, and it is determined that a close failure has occurred in the valve in a case where the ignition timing after the compensation is delayed compared to second reference ignition timing.

14. The failure diagnostic method according to claim 10, wherein a value of the ignition timing is accumulated for a predetermined time period from when the intake air stream control device starts to be operated; an average value of the ignition timing during the predetermined time period is calculated based on the predetermined time period and an accumulated value of the ignition timing; and the failure diagnosis for determining whether a failure has occurred in the intake air stream control device is performed by comparing the average value of the ignition timing and the reference ignition timing.

15. The failure diagnostic method according to claim 10, wherein the ignition timing is changed under the predetermined condition that the engine has just been started while the engine is cold.

16. The failure diagnostic method according to claim 10, wherein feedback control of the ignition timing is performed such that the engine rotational speed of the internal combustion engine becomes equal to the target rotational speed.

17. A failure diagnostic apparatus for an intake air stream control device which is provided in an intake system for an internal combustion engine, and which forms an air stream in a combustion chamber of the internal combustion engine by changing a flow of intake air when the intake air is introduced to the combustion chamber, the failure diagnostic apparatus comprising:

ignition device which is provided in the combustion chamber;

ignition timing control means changing ignition timing of the ignition device such that an engine rotational speed of the internal combustion engine becomes equal to a target rotational speed under a predetermined condition; and failure diagnostic means for performing a failure diagnosis for determining whether a failure diagnostic has occurred in the intake air stream control device based on whether the changed ignition timing is different from reference ignition timing that is a reference for the failure diagnosis.

* * * * *